US005126768A

United States Patent [19]

Nozawa et al.

[11] Patent Number: 5,126,768

[45] Date of Patent: Jun. 30, 1992

[54] PROCESS FOR PRODUCING AN INK JET RECORDING HEAD

[75] Inventors: Minoru Nozawa; Tadayoshi Inamoto, both of Machida; Hideaki Mashio, Sagamihara; Masami Yokota, Kawasaki, all of Japan

[73] Assignee: Canon Kabushiki Kaisha, Tokyo, Japan

[21] Appl. No.: 630,758

[22] Filed: Dec. 21, 1990

Related U.S. Application Data

[63] Continuation of Ser. No. 497,312, Mar. 22, 1990, abandoned.

[30] Foreign Application Priority Data

| | | | |
|---|---|---|---|
| Mar. 24, 1989 | [JP] | Japan | 1-072184 |
| Apr. 5, 1989 | [JP] | Japan | 1-084742 |

[51] Int. Cl.[5] .......... G01D 15/16; G01D 15/18; B44C 1/22; B29C 37/00

[52] U.S. Cl. .......... 346/140 R; 156/630; 156/633; 156/644; 156/655; 156/659.1; 156/668

[58] Field of Search .......... 156/272.2, 629, 630, 156/633, 644, 655, 659.1, 668; 346/1.1, 140 R

[56] References Cited

U.S. PATENT DOCUMENTS

| | | | |
|---|---|---|---|
| 4,558,333 | 12/1985 | Sugitani et al. | 346/140 R |
| 4,587,534 | 5/1986 | Saito et al. | 346/140 R |
| 4,657,631 | 4/1987 | Noguchi | 156/655 |
| 4,775,445 | 10/1988 | Noguchi | 156/630 X |

FOREIGN PATENT DOCUMENTS

| | | |
|---|---|---|
| 0177932 | 4/1986 | European Pat. Off. . |
| 0154947 | 7/1986 | Japan . |
| 2189746 | 11/1987 | United Kingdom . |

*Primary Examiner*—William A. Powell
*Attorney, Agent, or Firm*—Fitzpatrick, Cella, Harper & Scinto

[57] ABSTRACT

A process for producing a liquid jet recording head comprises the step of laminating a solid layer for formation of a liquid channel, a photosensitive material to be provided so as to cover over the solid layer, a discharge opening plate provided with a discharge opening communicated to the liquid channel in this order on a substrate; the step of irradiating an active energy ray in a pattern on the photosensitive material layer; and the step of removing the solid layer and the uncured portion of said photosensitive material layer corresponding to the pattern to form the liquid channel.

13 Claims, 10 Drawing Sheets

PROCESS FOR PRODUCING AN INK JET RECORDING HEAD

This application is a continuation of application Ser. No. 07/497,312 filed Mar. 22, 1990, now abandoned.

BACKGROUND OF THE INVENTION

1. Field of the Invention

This invention relates to a process for producing an ink jet head, particularly to a process for producing a liquid jet recording head (ink jet recording head) having a discharging opening plate of the type, in which the direction of feeding liquid (ink) to the discharge energy generating member-corresponding portion in the liquid channel (ink pathway) and the discharge direction of the liquid from the discharge opening are different, as a part of the constitution.

2. Related Background Art

The Liquid jet recording head (ink jet recording head) applied to the liquid jet recording system (ink jet recording system) is generally equipped with a fine discharge opening for recording liquid (hereinafter also referred to as "orifice"), a liquid channel (ink pathway) and a liquid discharge energy-generating portion provided on a part of said liquid channel. In the prior art, as the method for preparing such a liquid jet recording head, for example, there has been known a method, in which a plate such as glass, metal, etc. is used, a fine groove is formed by working such as cutting, etching, etc. and then the plate having said groove formed thereon is bonded with another appropriate plate to form a liquid channel.

However, in the liquid jet recording head prepared according to such prior art method, the coarseness of the inner wall surface of the liquid channel formed by cutting may be too great or distortion may occur in the liquid channel due to the difference in etching rate, whereby there were problems such that it was difficult to obtain liquid channels with constant liquid channel resistance, and that variance might occurr in the recording liquid discharge characteristics of the liquid jet recording head after preparation. Also, defects and cracks in the plate wear liable to be formed during cutting, whereby there was also the problem that the production yield was not so good.

Further, in the case of etching, the production steps are many, whereby there was also a disadvantage that increase of the production cost was brought about.

On the other hand, as the problem common to the above-mentioned prior art methods, in plastering a grooved plate having liquid channel formed thereon with a substrate provided with a driving element such as a piezoelectric element or electricity-heat converter for generating the discharge energy to be utilized for discharging recording liquid, registration between these plates was difficult, whereby there was also the problem of lacking bulk productivity .

Also, a liquid jet recording head, generally under its use environment, is always in contact with a recording liquid (generally an ink solution composed mainly of water which is not neutral in most cases, or an ink solution composed mainly of an organic solvent). Therefore, while the structural material constituting the liquid jet recording head is desired to not be affected by the recording liquid, regarding its strength or on the contrary to not contain a harmful component which will lower recording liquid adaptability, in the prior art method as mentioned above, partially because of the restriction of the working method, etc., it has not necessarily been possible to choose a material suited for such objects.

As the technique for solving such problems of the prior art methods, the present inventors invented a process for producing a liquid jet recording head by use of an active energy ray curable material as the member for formation of the liquid channel wall as disclosed in Japanese Patent Laid-open Application No. 61-154947.

However, said method proved to be not necessarily satisfactory in manufacturing freely the liquid chamber, such as the size and the height of the liquid chamber connected to the liquid channel. Particularly, in a liquid jet recording head of the full-line type which performs discharging over the full paper width of recording paper with orifices and liquid channels communicated thereto arranged at high density, it is important to make the liquid chamber volume large in order to effect stable and uniform discharging of recording liquid, and it has been strongly desired to develop a production process suited for bulk production of a liquid jet recording head of such high density multi-orifice type.

In order to solve these problems, the present inventors invented a process which comprises, as a summary, laminating successively on a first substrate a solid layer for formation of at least one liquid channel, an active energy ray curable material layer to be utilized for formation of the wall of the liquid channel and a second substrate, then laminating a mask of said second substrate, irradiating an active energy ray from above said mask to cure at least the wall of liquid channel of the active energy ray curable material layer, and further removing the solid layer and the active energy ray curable material layer from between the two substrates as presented in U.S. Ser. No. 500,094, filed Mar. 21, 1990, U.S. Pat. No. 5,030,317 which is a continuation of U.S. Ser. No. 177,833, filed Mar. 24, 1988, abandoned and which is a continuation of U.S. Ser. No. 038,766, filed Apr. 15, 1987, abandoned.

However, in said process, because of having a mask laminated on said second substrate, due to the influence of diffraction of active energy ray or the oblique light component in the active energy ray in the process of passing through said second substrate, the edge portion of the pattern of the cured portion becomes indistinct, whereby the liquid channel, etc. of desired shape could not be obtained in some cases.

Further, in this process, an alignment device for registration between said second substrate and said mask is required.

Besides, in this process, when slippage occurs in registration in the alignment operation, the precision of liquid channel dimensions becomes worse. Also, there is such problem that for correct registration, a skilled technique and much time are required.

In the state of the art as described above, as the liquid jet recording head which performs recording by discharging liquid through discharge opening, various types have been known.

As broadly classified, there are the type in which the feeding direction of liquid to the portion where the energy to be utilized for discharging liquid from the discharge energy generating member in the liquid channel and the discharge direction from the discharge opening are substantially the same, and the type in which these directions differ by, for example, 70°.

As the production process of the latter type, for example, the process as described below is disclosed in Japanese Patent Laid-Open Application has been known.

First, as shown in FIG. 1A, on a substrate 1 provided with an energy generating member 2 for generating the energy to be utilized for discharging liquid, in order to provide energy acting chambers 18 and a liquid chamber 11 communicated commonly to the respective energy acting chambers according to the photolithographic method conventionally practiced, for example, a wall 16 with a predetermined shape is formed by use of a photosensitive material.

Next, as shown in FIG. 1B, the discharge opening plate 6 having discharge openings 8 for discharging liquid is bonded to the wall 16 with an adhesive 17 with registration so that the respective discharge openings may be arranged corresponding to the respective energy acting chambers, to give a liquid jet recording head as shown in the plan view in FIG. 1C.

However, according to the process as described above, since the step of bonding the discharge opening plate with an adhesive after formation of the energy acting portions and the wall for formation of the common chamber with a photosensitive material; the following problems sometimes occurred.

1) Into the liquid channel and the common liquid chamber formed on the substrate, through the preparation steps, garbage or dust, etc. are liable to be entrained and remain, whereby the yield is poor.

2) Setting of the kind and application conditions of the adhesive during bonding of the discharge opening plate was difficult, and in some cases, the discharge opening may be clogged with the adhesive, or the adhesive may flow into the liquid channel and the liquid chamber.

3) For obtaining well-balanced adhesion strength on the respective bonded surfaces of the wall formed by use of the photosensitive resin, the adhesive layer and the discharge opening plate, the kind of the adhesive employed is limited.

4) A flat plane characteristic is necessary for good adhesion of the bonded surface between the discharge opening plate and the wall on the substrate.

SUMMARY OF THE INVENTION

An object of the present invention is to provide a process for producing a novel liquid jet recording head which has solved the problems as described above having accompanied a process for producing a liquid jet recording head which utilizes the step of finally removing the material functioning as the mold for formation of liquid channel, etc. from between the two substrates and forming a space for liquid channel and liquid chamber, etc.

Another object of the present invention is to provide a process for producing a novel liquid jet recording head which can form a liquid chamber as desired, and also can supply a liquid jet recording head which is inexpensive, precise and also high in reliability.

Still another object of the present invention is to provide a novel liquid jet recording head capable of providing a liquid jet recording head having a structure with a liquid channel being finely worked with good precision and also with good yield.

Still another object of the present invention is to provide a process for producing an ink jet recording head excellent in mechanical strength and chemical resistance with little mutual influence from the recording liquid.

Still another object of the present invention is to provide a process for producing a liquid jet recording head which has solved the problems occurring in a process having the step of bonding a discharge opening plate to liquid channel, etc. by use of an adhesive.

Still another object of the present invention is to provide a process for producing a liquid jet recording head, comprising:

the step of laminating a solid layer for formation of a liquid channel, a photosensitive material to be provided so as to cover over said solid layer, a discharge opening plate provided with a discharge opening communicated to said liquid channel in this order on a substrate;

the step of irradiating an active energy ray in a pattern on said photosensitive material layer; and the step of removing said solid layer and the uncured portion of said photosensitive material layer corresponding to said pattern to form said liquid channel.

Still another object of the present invention is to provide a process for producing a liquid jet recording head, comprising:

the step of filling a filling material having photosensitivity to an active energy ray at the concavity of an uneven member having an uneven portion for formation of a liquid channel communicated to a discharge opening for discharging liquid;

the step of providing a substrate provided with a shielding layer against said active energy ray on said uneven portion with said shielding layer being on the lower side;

The step of iradiating the active energy ray in a pattern on said filling material by use of said shielding layer; and the step of removing the convexity of said uneven member and a part of said filling material corresponding to said pattern to form said liquid channel.

In one embodiment of the present invention, in effecting patterning of the filling material comprising a material having photosensitivity to the active energy ray for formation of the wall of liquid channel and liquid chamber, etc. by pattern-shaped irradiation of the active energy ray, the active energy ray is not irradiated with a mask placed above the first substrate or the second substrate, but exposure is effected with a shielding layer of the active energy ray functioning as the exposure mask on the surface opposed to the filling material of the first substrate or the second substrate.

As the result, registration working between the layer comprising the mask and the photosensitive material and the first substrate or the second substrate and the device necessary therefor becomes unnecessary, whereby precision improvement of ink liquid channel and shortening of working time can be effected.

Further, no influence from the oblique component or diffractions, etc. of the active energy ray is effected, whereby the pattern edge of the pattern obtained by patterning of the filling material becomes sharp, and precision of the ink liquid channel is improved.

Also, no expensive active energy ray irradiation device giving particularly high parallelness is required.

In addition , according to the process of the present invention, since the portion which becomes liquid channel, etc is occupied by the solid layer, there is no entrainment and remaining of garbage, dust, etc. into the liquid channel, etc. throughout the production steps.

Also, through the curing treatment by irradiation of the active energy ray onto the portion which becomes the wall of at least liquid channel of the photosensitive material layer (active energy ray curable material layer), well-balanced bonded state of the substrate, the wall comprising the cured layer and the discharged opening plate can be obtained, whereby various problems as described above accompanying the use of an adhesive can be avoided.

That is, since no adhesive is used for bonding of the discharge opening plate, no cumbersome operation caused by use of an adhesive becomes necessary.

Also, since the bonded portions in the recording head become the two places between the substrate and the cured layer for forming the wall and between said cured layer and the discharge opening plate, restrictions concerning choice of the materials for enhancing bonding strength in the structure of the prior art utilizing the adhesive layer are alleviated, whereby the degree of freedom in design becomes greater.

Further, no such strict flat plane characteristic as in the case of using an adhesive for the bonded surface between the discharging opening plate and the cured layer is demanded.

Therefore, according to the process of the present invention, the overall yield in formation of liquid channel, etc. and bonding of discharge opening plate are improved to a great extend, whereby the production cost can be lowered to a great extent.

BRIEF DESCRIPTION OF THE DRAWINGS

FIG. 7 through FIG. 13 are schematic diagrams for illustration of the basic steps of the production process of the head according to another embodiment of the present invention:

FIG. 7: a schematic perspective view of the first substrate before formation of the uneven member;

FIG. 13: a schematic perspective view of the liquid jet recording head under the completed state.

In FIGS. 9 through 12, the respective A-series Figures are cut sectional views cut at the positions corresponding to the line A—A' in FIG. 8A and FIG. 8B, and the B-series Figures are cut sectional views cut at the positions corresponding to the B—B' line in FIG. 8A and FIG. 8B.

DESCRIPTION OF THE PREFERRED EMBODIMENTS

Figure 1A:
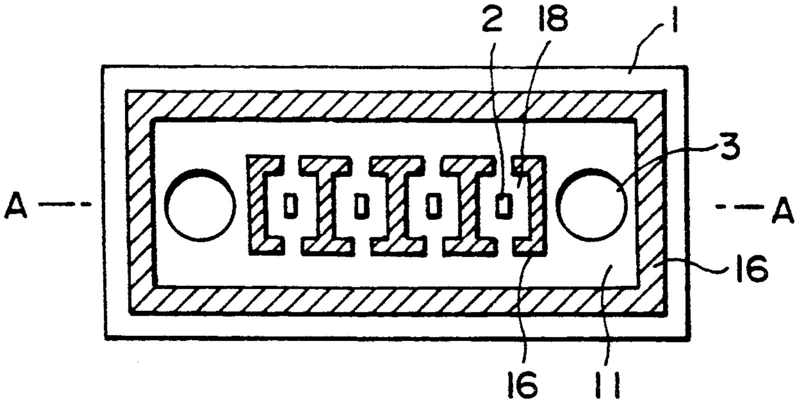
FIGS. 1A-1C are diagrams showing the production steps of the head according to the prior art.
Figure 1B:
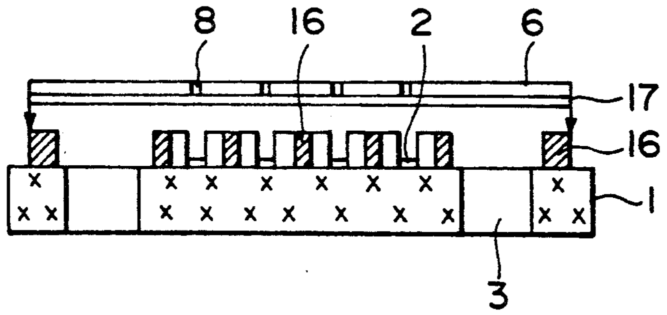
Figure 1C:
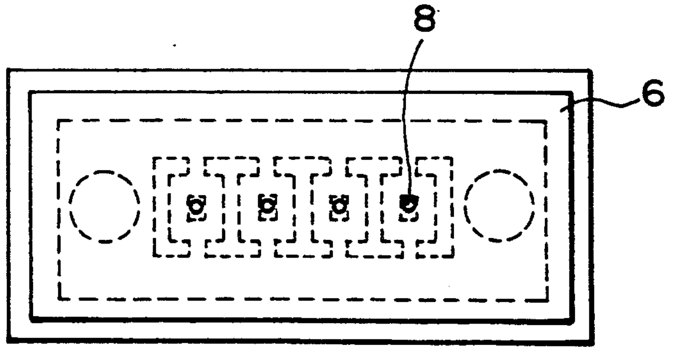

Referring now to the drawings, an example of the present invention is described in detail.

In the following examples, the liquid channel and the common liquid chamber are formed according to the process of the present invention, but simultaneous formation of the common liquid chamber may be performed if desired, and the process of the present invention may be also used for formation of only the liquid channel. These liquid channels, common liquid chambers, etc. are comprehensively called "pathway of ink".

Figures 2A, 2B, 2C, 2D, 2E, 2F:
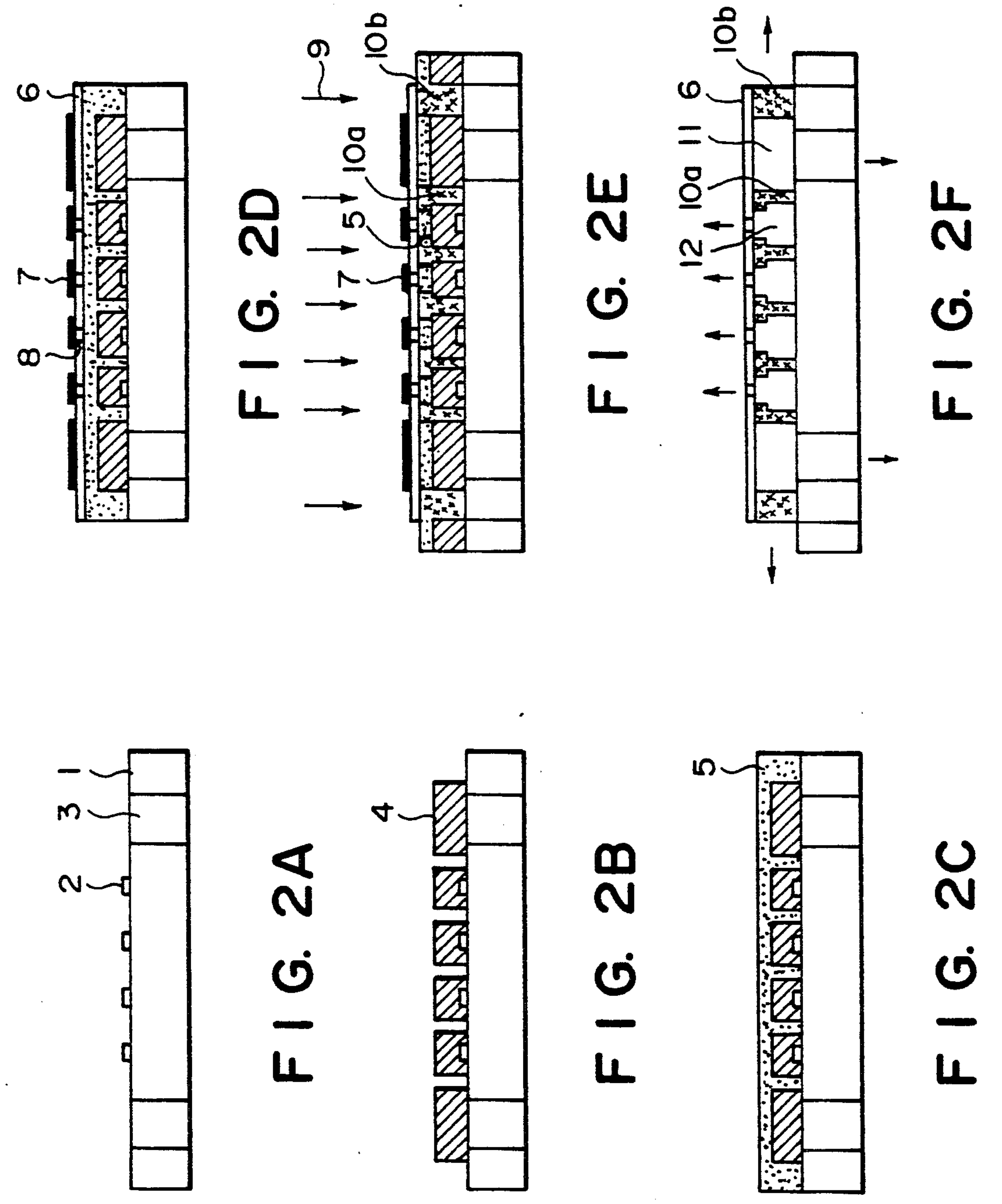
FIGS. 2A-2F are step diagrams showing the main steps in one embodiment of the process of the present invention.

First, as shown in FIG. 2A, discharge energy generating members 2 are arranged at predetermined positions, and a solid layer 4 is provided as occupying at least the liquid path portion on a substrate 1 having liquid feeding openings 3.

Figure 3A:
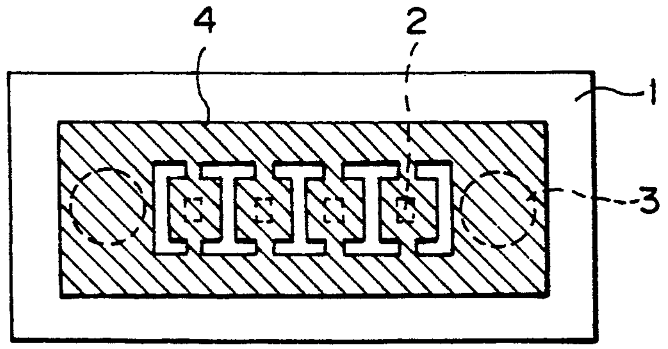
FIG. 3A is a plan view of the state in FIG. 2B, FIG. 3B a plan view of the state in FIG. 2D, FIG. 3C a perspective view of the state in FIG. 2F, FIGS. 4A and 4B, FIG. 5 and FIG. 6 illustrations showing the setting modes of the shielding portion in other embodiments of the present invention.

A sectional view of the substrate provided with the solid layer is shown in FIG. 2B, and its plan view in FIG. 3A.

The substrate 1 constitutes a part (bottom) of the liquid channel and the common liquid chamber, and also functions as the support for the solid layer 4 and the active energy ray curable material layer formed as described below, and its shape and material may be selected depending on the design of a desired liquid jet recording head.

As the discharge energy generating member 2 for generating the energy to be utilized for discharging liquid, a heat energy generating member which generates heat energy as the discharge energy such as electricity-heat converter, etc., or one which generates the pressure for discharge by mechanical deformation such as a piezoelectric element, etc. can be utilized.

To the discharge energy generating member is connected a means for giving signals directing generation of discharge energy, such as electrodes for applying electrical signals, although not shown. Also, for the purpose of improving durability of these discharge energy generating members, various functional layers such as protective layer, etc. may be also provided.

The above solid layer 4 is removed after the respective steps described below, and said removed portion becomes the liquid channel and the common liquid chamber. Therefore, arrangement of the solid layer 4 is determined corresponding to the shape and the arrangement of the desired liquid channel and common liquid chamber.

As the material and means to be used for constituting the solid layer 4, those as set forth below may be exemplified specifically.

(1) A photosensitive dry film is used, and the solid layer is formed according to the so-called image forming process of dry film.

(2) On the substrate 1 are laminated a solvent soluble polymer layer with a desired thickness and a photoresist layer successively, and after pattern formation of the photoresist layer, the solvent soluble polymer layer is selectively removed.

(3) Printing is effected on a resin.

As the photosensitive dry film mentioned in (1), both positive type and negative type are available. For example, in case of a positive type dry film, a positive type dry film solubilized into a developer by an active energy ray irradiation is suitable, while in case of negative type dry film, a negative type dry film which is a photopolymerizable type but can be dissolved or peeled off with methylene chloride or a strong alkali is suitable.

As the positive type dry film, specifically, for example "OZATEC R225" (trade name, Hoechst Japan K.K.) may be employed, while as the negative type dry film, "OZATEC T Series" (trade name, Hoechst Japan K.K.), "PHOTEC PHT Series" (trade name, Hitachi Kasei Kogyo, K.K.), "RISTON" (trade name, Du Pont de Nemours Co.), etc.

Of course, not only these commercially available materials, but also resin compositions acting in positive type fashion, for example, resin compositions composed mainly of naphthoquinonediazide derivatives and novolac type phenol resins, and resin compositions acting in negative type fashion, for example, compositions composed mainly of acrylic oligomers having acrylic ester as the reactive group, thermoplastic polymeric compounds and sensitizers, or compositions comprising polythiols, polyene compound and sensitizers, etc. can be similarly used.

As the solvent soluble polymer mentioned in (2), any polymeric compound for which a solvent capable of dissolving it exists and which can form a coated film by way of coating may be available. As the photoresist layer which can be used here, there may be typically included positive type liquid photoresist comprising novolac type phenol resin and naphthoquinonediazide, negative type liquid photoresist comprising polyvinyl cinnamate, negative type liquid photoresist comprising cyclized rubber and bisazide, negative type photosensitive dry film, thermosetting type and UV-ray curable type inks, etc.

As the material for forming the solid layer by the printing method mentioned in (3), for example, here may be employed lithographic ink, screen and transfer type resin, etc. which have been used in the respective drying systems of the evaporation drying type, thermosetting type or the UV-ray curing type, etc.

Among the materials as mentioned above, in view of working precision, easiness of removal or workability, the means employing the photosensitive film of (1) is preferable, and among them it is particularly preferable to use a positive type dry film. That is, positive type photosensitive material is more excellent in, for example, resolution than negative type photosensitive material. It has a specific feature that a relief pattern having a vertical and smooth side wall surface or a sectional shape of tapered or reverse-tapered form can be easily made, which is the optimum in formation of ink pathway. Also, it has a specific feature that the relief pattern can be dissolved away by a developer or an organic solvent, and therefore preferable as the material for formation of the solid layer in the present invention. Particularly, the positive type photosensitive material by use of naphthoquinonediazide and novolac type phenol resin can be completely dissolved in a weakly alkaline aqueous solution or an alcohol, and therefore no damage of the discharge energy generating element will be given at all, and also it can be removed very quickly in the later steps. Among such positive type photosensitive materials, one shape in dry film is the most preferable material in that a film with a thickness of 10 to 100 μm can be obtained.

Next, on the substrate 1 having the solid layer 4 formed thereon is laminated an active energy ray curable material layer 5 so as to cover said solid layer 4, as shown in FIG. 2C.

As the active energy ray curable material, any material which can be provided covering the above solid layer can be suitably used. However, since said material becomes the structural member of the liquid recording head by formation of the walls of the liquid channel and the common liquid chamber, it is preferable to choose and use one which is excellent in aspects of adhesion to the substrate, mechanical strength, dimensional stability, corrosion resistance. Specific examples of such material may be suitably active energy curable materials which are liquid and curable with UV-ray and electron beam, above all epoxy resins, acrylic resins, diglycol dialkylcarbonate resins, unsaturated polyester resins, polyurethane resins, polyimide resins, melamine resins, phenol resins, urea resins, etc. Particularly, epoxy resins which can initiate cation polymerization with light, acrylic oligomers having acrylic ester groups capable of radical polymerization with light, photo-addition polymerization type resin by use of polythiol and polyene, unsaturated cycloacetal resins, etc. are great in polymerization rate, also excellent in the physical properties of polymer, and therefore suitable as the structural material.

As the lamination method of the active energy ray curable material, for example, there may be specifically included the methods of lamination by means of discharging instrument by use of nozzles suitable for the substrate, applicator, curtain coater, roll coater, spray coater, spin coater, etc. In the case of laminating a curable liquid material, it is preferable to perform lamination while avoiding mixing of air bubbles after degassing said material.

Next, as shown in FIG. 2D, a discharge opening plate 6 is bonded onto the active energy ray curable material layer 5 of the substrate 1.

In the bonding operation, in order to form the active energy ray curable material layer to a desired thickness, some contrivances may be made, for example, provision of a spacer between the discharge opening plate 6 and the substrate 1, provision of concavity at the end of the discharge plate 6.

Figure 3B:
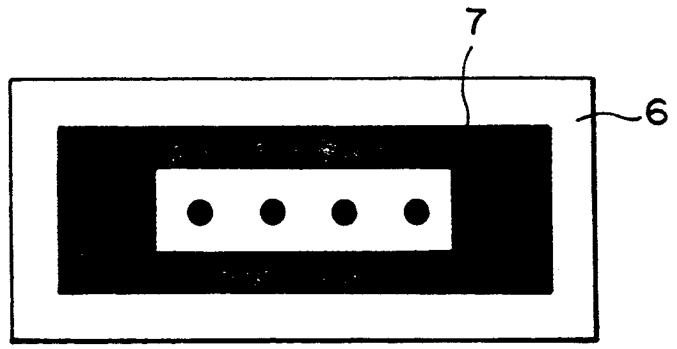

On the upper surface of the discharge opening plate 6 is provided a shielding layer 7 for shielding the active energy ray necessary for curing of the active energy rat curable material layer. A plan view of its state is shown in FIG. 3B. The shielding layer 7 may be also provided on the discharge opening plate 6 after provision of the discharge opening plate 6 on the active energy ray curable material layer 5.

The shielding layer 7 is provided at least at the position where the communicating portion between the discharge opening 8 and the liquid channel are formed in the steps as described below. Also, when it is necessary to reduce fluid resistance by enlarging the volume of the liquid channel, the energy acting chamber as the region corresponding to the discharging energy generating member formed in the liquid path, or the common chamber, by providing also shielding layers on the necessary portions such as the liquid chamber and the common liquid chamber as shown in FIG. 2D, the active energy ray curable material layers at the positions corresponding to their ceiling portions can be removed to make the volumes of these greater than those defined by the solid layer 4.

The thickness of the discharge opening plate 6 may be chosen corresponding to mechanical strength, desired discharge characteristics, etc. and, for example, a thickness of about 1 μm to 100 μm may be utilized.

The discharge opening plate 6 may be constructed of glass plate, plastic film or sheet, film or sheet of cured photosensitive composition, transparent ceramic board, etc.

The shielding layer 7 can be provided at desired position and in desired shape on the discharge opening plate 6 according to the patterning method utilizing photolithography by use of various photosensitive compositions, etc.

The shielding layer 7 is formed by choosing its material so that it can be finally removed from the discharge opening plate 6.

The shielding layer 7 can be formed by the method utilizing photolithographic step by use of a negative type photosensitive dry film such as those of trade means LAMINAR TD (DYNACHEM), SR-1000G-50 (Hitachi Kasei), etc. For removal of the shielding layer in this case, dipping treatment in a 2 to 5% alkali solution in the case of LAMINAR, and dipping treatment in a liquid such as methylene chloride, etc. in the case of SR-1000G-50 can be utilized. Effective removal is possible by using sonication in combination.

It is also possible to form the shielding layer 7 by the method utilizing the photolithographic step by use of a positive type photosensitive dry film such as the trade name OZATEC H225 (Hoechst Japan). By forming the shielding layer 7 of the same material as the solid layer 4, it becomes possible to remove these with the same liquid for removal. As the liquid for removal in this case, solvents such as alcohols and alkali solutions of 1% or more can be utilized.

After thus obtaining a laminate having successively laminated the substrate 1, the solid layer 4, the active energy ray curable material layer 5 and the discharge opening plate 6, an active energy ray 9 is irradiated from above the discharge opening plate 6 as shown in FIG. 2E.

By irradiation of the active energy ray 9, the active energy ray curable material at said irradiated portion is cured to form cured resin layers 10*a*, 10*b*, and at the same time bonding of the substrate 1 and the discharge opening plate 6 is effected by said curing.

As the active energy ray, UV-ray, electron beam, visible light, etc. can be utilized, but since exposure is effected by transmitting through the discharge opening plate 6, UV-ray, visible light are preferable, and in aspect of polymerization rate, UV-ray is the most suitable. As the ray source for UV-ray, light sources with high energy density such as high pressure mercury lamp, ultra-high pressure mercury lamp, halogen lamp, xenon lamp, metal halide lamp, carbon arc, etc. may be preferably employed. Although working with better precision can be done, as the light from these light sources is higher in parallelness and less in heat generation, UV-rays which are generally used for working of printing plate or print wiring or curing of photocurable type paint are generally available.

Subsequently, from the laminate cured by active energy ray irradiation are removed the solid layer 4 and the uncured active energy ray curable material portion as shown in FIG. 2F to form the liquid channel 12 and the liquid chamber 11.

The method for removing the solid layer 4 and the active energy curable material portion is selected depending on the kinds of the solid layer and the active energy ray curable material employed.

Specifically, for example, the method of removing by dipping in a liquid for removal which dissolves or swells or peel off the solid layer 4 and the active energy ray curable material, etc. may be mentioned as preferable one. In this case, if necessary, removal acceleration means such as sonication treatment, spraying, heating, stirring, vibration, pressurized circulation and others can be also used.

As the above-mentioned liquid for removal, for example, it can be chosen from halo-containing hydrocarbons, ketones, esters, aromatic hydrocarbons, ethers, alcohols, N-methylpyrrolidone, dimethylformamide, phenol, water, water containing acid or alkali, etc. In said liquid for removal, a surfactant may be also added, if necessary.

Figure 3C:
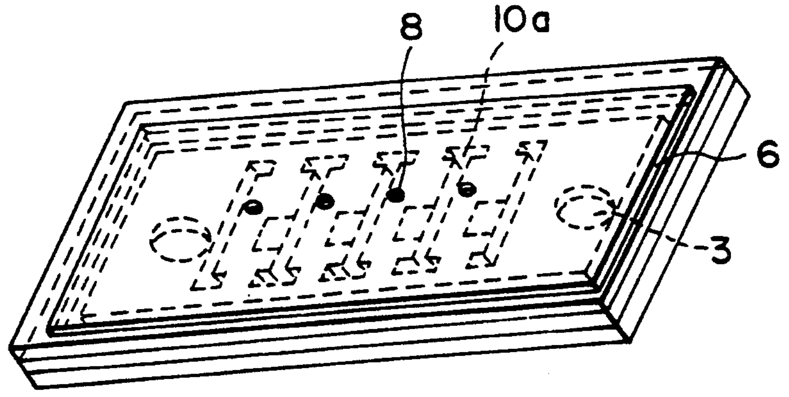

In the constitution shown in the drawings, the laminate after completion of the active energy ray irradiation treatment can be dipped in a liquid which dissolves the solid layer 4, etc. to dissolve away the solid layer 4 and the uncured portion from the discharge opening 8 and the liquid feeding opening 3, thereby obtaining the state shown in FIG. 3C.

The liquid feeding opening is not necessarily provided on the substrate 1, but may be also provided on another portion if desired, and it is preferably provided at the position where the solid layer 4, etc. can be easily dissolved away.

Figure 4A:
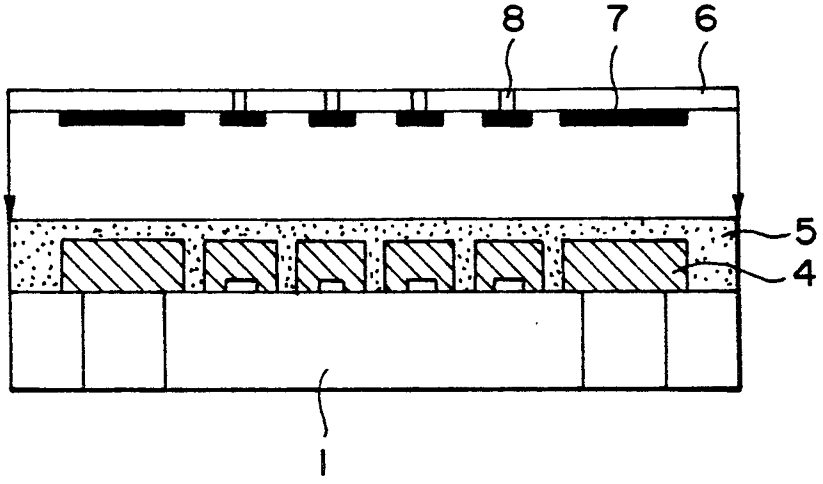
Figure 4B:
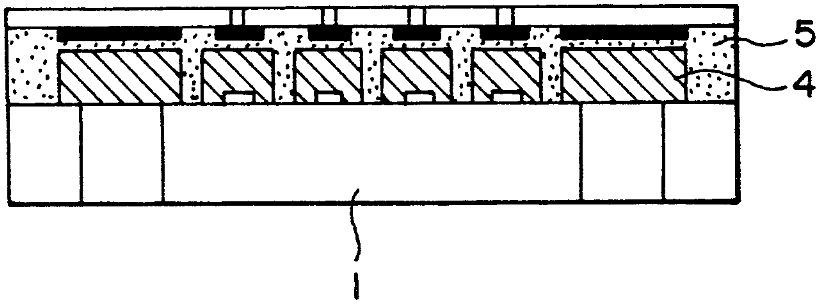

In the example as described above, a shielding layer is provided on the upper surface of the discharge opening plate, but as shown in FIG. 4A, a shielding layer 7 may be provided on the lower surface of the discharge opening plate 6 to provide a laminate as shown in FIG. 4B.

Figure 5:
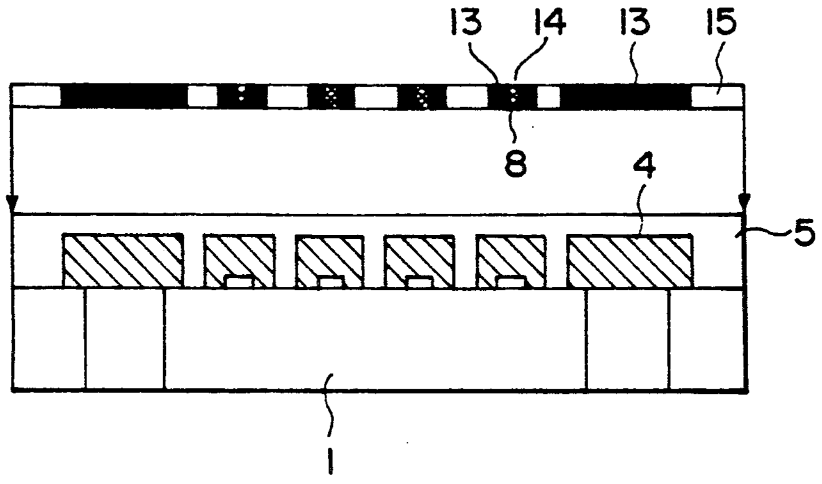

Further, as shown in FIG. 5, it is also possible to use a discharge opening plate 15 having a portion 13 for shielding the active energy ray formed at the necessary portion, and also being filled at the discharge opening 8 with an active energy ray shielding material so as to be finally removable.

The active energy ray shielding portion 13 can be formed by, for example dispensing a colorant at a predetermined portion of a glass plate.

Also, filling of the active energy ray shielding material 14 into the discharge opening 8 may be practiced by utilizing the method in which a wax having light shieldability is dissolved in a suitable solvent and the solution is injected into the discharge opening 8, followed by removal of the solvent by heating treatment, or the method in which a positive type resist such as the trade name OFPR800 (Tokyo Oka), etc. is injected into the discharge opening 8, and the solvent is removed by heating treatment, etc.

In the discharge opening plate shown in FIG. 5, filling of the active energy ray shielding material 14 into the discharge opening 8 is not necessarily required. That is, when the material 14 is not employed, the active energy ray curable material beneath the discharge opening 8 is cured, but during removal of the uncured portion surrounding the cured portion in shape of doughnut, also the cured portion beneath the discharge opening 8 can be removed easily by sonication and pressurized circulation of liquid in the dissolving solution.

Figure 6:
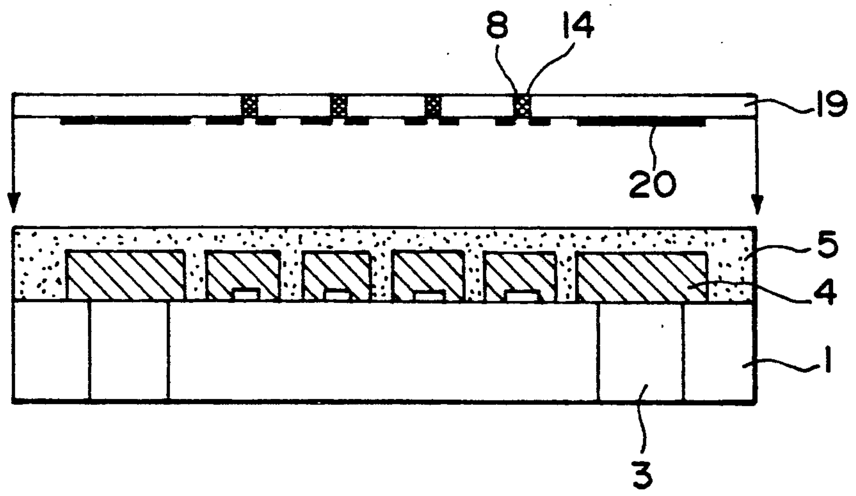

Further, as shown in FIG. 6, it is also possible to utilize a discharge opening plate 19 provided by filling the active energy ray shielding material 14 into the discharge opening 8 similarly as in the example shown in FIG. 5, and providing the shielding layer 20 on the lower surface of the discharge opening plate 19 by patterning of an inorganic material layer having light shieldability such as aluminum, chromium, etc. according to the method utilizing the photolithographic steps.

EXAMPLE 1

Following the steps shown in FIGS. 2A-2F, a liquid jet recording head was prepared.

First, on a silicon plate having a $SiO_2$ thermally oxidized layer (layer thickness 5 μm) as the substrate 1 were arranged heat generating elements (50 μm×50 μm×1500 Å, arrangement pitch 125 μm) comprising HFB2 as the discharge energy generating member 2 as shown in FIG. 2A. To the respective heat-generating elements were connected wirings for applying signals for discharge, and on these heat-generating elements and wirings were provided a $SiO_2$ protective layer (layer thickness 1.0 μm).

Next, as shown in FIG. 2B, a solid layer 4 with a predetermined shape (layer thickness 20 to 200 μm) was formed on the substrate according to the method utilizing photolithographic steps by use of a photosensitive dry film.

Next, as shown in FIG. 2C, an active energy ray curable material layer 5 curable with UV-ray covering over the solid layer 4 was formed by coating according to such method as roll coating, dispenser, lamination or spraying, etc.

Next, on a plate comprising a transparent resin such as glass, polyethylene terephthalate, etc. are formed discharge openings 8 (inner diameter 40 μm, arrangement pitch 125 μm) were formed, and further on the upper surface thereof was provided a shielding layer (layer thickness 20 to 200 μm) as shown in FIG. 2D according to the method as described above to obtain a discharge opening plate 6.

The portion of the shielding layer 7 covering over the discharge opening 8 was made a circular shape of 50 μm in diameter concentric with the discharge opening 8, and the portion on the solid layer 4 was made coincident with the shape of the common liquid chamber.

The discharge opening plate 6 thus prepared was laminated under pressurization as shown in FIG. 2D on the active energy ray curable material layer 5 with registration to obtain a laminate.

Next, as shown in FIG. 2E, UV-ray (parallel light) was irradiated from above the discharge opening plate 6 side. The irradiation condition was 100 $J/cm^2$.

After completion of irradiation, the laminate was dipped under normal temperature for about 10 minutes, and the solid layer 4 and the uncured portion of the active energy ray curable material layer 5 were dissolved away from between the substrate 1 and the discharge opening plate 6. Further, after washing and drying, the shielding layer 7 on the upper surface of the discharge opening plate 6 was removed by the method as described above to obtain a liquid jet recording head.

Here, the method of removing the solid layer and the uncured material after removal of the shielding layer 7 was found to be more effective.

Also, depending on the combination of materials, the shielding layer 7, the solid layer 4 and the uncured material can be removed at the same time.

EXAMPLE 2

A laminate shown in FIG. 4B was obtained according to the same steps of FIGS. 2A-2F in Example 1 except for using a discharge opening plate 6 shown in FIG. 4A. The layer thickness of the shielding layer 7, which determines the distance between the discharge energy generating member and the discharge opening, was chosen between 20 μm and 200 μm in view of the discharge characteristics.

Next, said laminate was subjected to the same dipping treatment as in Example 1, and the shielding material 7, the solid layer 4 and the uncured portion of the active energy ray curable material layer 5 were dissolved away from between the substrate 1 and the discharge opening plate 6, followed by washing and drying, to obtain a liquid jet recording head.

Referring now to the drawings, other embodiments of the present invention are described in detail.

In the following examples, a material which is cured by irradiation of an active energy is used as the filling material, but the present invention is not limited thereto.

FIG. 7 through FIG. 13 are schematic diagrams for illustration of the basic embodiments of the present invention, and in each of FIGS. 7 through 13, an example of the constitution of the liquid jet recording head according to the present invention and its preparation procedure are shown.

In this example, a liquid jet recording head having two orifices is shown, but the same is the case when a high density multi-orifice liquid recording head having more orifices or a liquid jet recording head having one orifice is used, as a matter of course.

Figure 7:
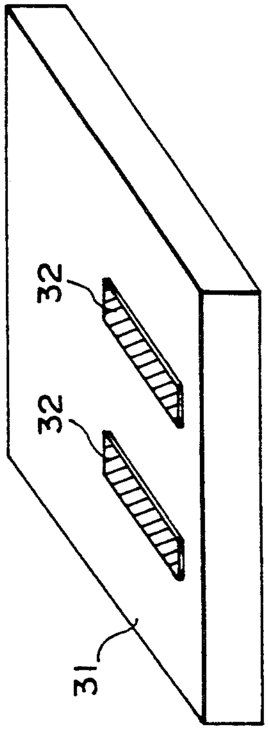

In the present invention, two substrates are employed, each comprising, for example, glass, ceramics, plastic or metal, etc., and at least one of which is active energy ray transmissive. FIG. 7 is a schematic perspective view of an example of the first substrate before formation of the uneven member occupying at least the portion which becomes the liquid channel (flow channel of recording liquid).

The first substrate 31 functions as a part of the liquid channel and the liquid chamber constituting material, and also as the support during lamination of the uneven member as described below and the filling member comprising an active energy ray curable material as described below.

When the step of the active energy ray irradiation as described below is performed from the side of said subtrate 31, the first substrate is required to be the active energy ray transmissive, but when no irradiation of active energy is effected from the side of said first substrate 31, its shape, material, etc. are not particularly limited.

On the above first substrate 31 are provided liquid discharge energy generating elements 32 such as heat generating elements or piezoelectric elements, etc. in a desired number (two in FIG. 7). Discharge energy for discharging small droplets of recording liquid are given to the recording liquid by such liquid discharge energy generating elements 32 to effect recording.

For example, when an electricity-heat convertor is used as the above liquid discharge energy generating element 32, recording liquid is discharged by heating of the recording liquid by the element in the vicinity thereof. Also, for example, when a piezoelectric element is used, recording liquid is discharged by mechanical vibration of the element.

To these elements 32 are connected electrodes (not shown) for inputting control signals for actuating these elements. Also, as a general practice, for the purpose of improving durability of these discharge energy generating elements, etc., various functional layers such as protective layers, etc. are provided, and of course such functional layers can be also provided in the present invention.

Figure 8B:
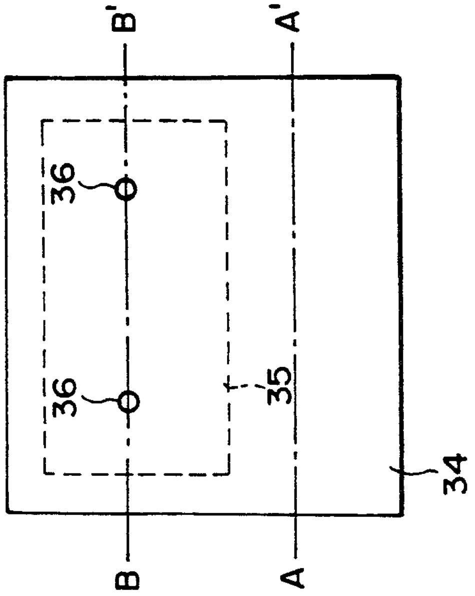
FIG. 8B: a schematic plan view of the second substrate.
Figure 8A:
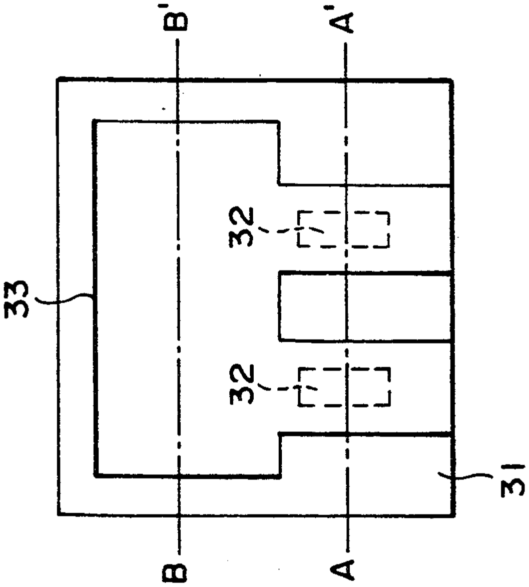
FIG. 8A: a schematic plan view of the first substrate after formation of the uneven member.

Subsequently, at the liquid channel forming site and the liquid chamber forming site communicated thereto on the first substrate 31 including the above liquid discharge energy generating elements 32, for example, an uneven member 33 which becomes the mold of the walls of the liquid channel and the liquid chamber as shown in FIG. 8A is provided.

In the present invention, the uneven member is not necessarily required to be provided on both of the liquid channel and liquid chamber forming sites, but the uneven member may be provided on at least the liquid channel forming site.

FIG. 8B shows an example of the second substrate. In this example, the second substrate 34 is constituted as having a concavity 35 at the predetermined site for formation of the liquid chamber and two liquid feeding openings 36. In the following, each A-series Figure in FIGS. 9 to 12 shows a schematic sectional view of the first and the second substrates cut along the line A—A′ in FIG. 8A and FIG. 8B, and each B-series Figure in FIGS. 9 to 12 a schematic sectional view of the first and the second substrates cut along the line B—B′ in FIG. 8A and FIG. 8B.

The above-mentioned uneven member 33 is removed after the respective steps as described below, and the space portion remained becomes at least the liquid channel.

The uneven member 33, when liquid chamber, etc. is formed at the same time if desired in addition to the liquid channel, is provided so as to occupy also the portion for forming the liquid chamber, etc.

Of course, the shapes of the liquid channel and the liquid chamber, etc. can be made as desired, and the uneven member 33 can be also made corresponding to the shapes of said liquid channel and liquid chamber.

In this example, the liquid channel is divided into two so that the recording liquid can be discharged from the respective two crifices (discharge openings) provided corresponding to the two discharge energy generating elements, and the liquid chamber is made one communicated to these so that the recording liquid can be fed to each of said liquid channels.

As the material and the means to be used in constituting such uneven member 33, for example, those as set forth below may be included as specific ones.

(1) By use of a photosensitive dry film, the uneven member is formed according to the image forming process of the so called dry film.

(2) On the substrate 31 are laminated a solvent soluble polymer layer and a photoresist layer with desired thicknesses successively, and after pattern formation of said photoresist layer, the solvent soluble polymer layer is selectively removed.

(3) Printing is effected on a resin.

As the photosensitive dry film mentioned in (1), both positive type and negative type are available. For example, if it is a positive type dry film, a positive type dry film solubilized into a developer by an active energy ray irradiation is suitable, while if it is a negative type dry film, a negative type dry film which is of the photopolymerizable type but can be dissolved or peeled off with methylene chloride or a strong alkali is suitable.

As the positive type dry film, specifically, for example "OZATEC R225" (trade name, Hoechst Japan K.K.) may be employed, while as the negative type dry film "OZATEC T Series" (trade name, Hoechst Japan K.K.), "PHOTEC PHT Series" (trade name, Hitachi Kasei Kogyo K.K.), "RISTON" (trade name, Du Pont de Nemours Co.), etc.

Of course, not only these commercially available materials, but also resin compositions acting in positive type fashion, for example, resin compositions composed mainly of naphthoquinonediazide derivatives and novolac type phenol resins, and resin compositions acting in negative type fashion, for example, compositions composed mainly of acrylic oligomers having acrylic ester as the reactive group, thermoplastic polymeric compounds and sensitizers, or compositions comprising polythiols, polyene compound and sensitizers, etc. can be similarly used.

As the solvent soluble polymer mentioned in (2), any polymeric compound for which a solvent capable of dissolving it exists and which can form a coated film by way of coating may be available. As the photoresist layer which can be used here, there may be typically included positive type liquid photoresist comprising novolac type phenol resin and naphthoquinonediazide, negative type liquid photoresist comprising polyvinyl cinnamate, negative type liquid photoresist comprising cyclized rubber and bisazide, negative type photosensitive dry film, thermosetting type and UV-ray curable type ink, etc.

As the material for forming the solid layer by the printing method mentioned in (3), for example, here may be employed lithographic ink, screen ink and transfer type resin, etc. which have been used in the respective drying systems of the evaporation drying type, thermosetting type or the UV-ray curing type, etc.

Among the group of materials as mentioned above, in view of working precision, ease of removal or workability, the means of employing the photosensitive film of (1) is preferable, and among them it is particularly preferable to use a positive type dry film. That is, positive type photosensitive material is more excellent in, for example, resolution than negative type photosensitive material. It has a specific feature that a relief pattern having a vertical and smooth side wall surface or a sectional shape of tapered or reverse-tapered form can be easily made, which is the optimum in formation of the liquid path. Also, it has a specific feature that the relief pattern can be dissolved away with a developer or an organic solvent, and therefore preferable as the material for formation of the uneven member in the present invention. Particularly, the positive type photosensitive material by use of naphthoquinonediazide and novolac type phenol resin can be completely dissolved in a weekly alkaline aqueous solution or an alcohol, and therefore no damage of the discharge energy generating element will occur at all, and also it can be removed very quickly in the later steps. Among such positive type photosensitive material, one shaped in dry film is the most preferable material in that a film with a thickness of 10 to 100 μm can be obtained.

Figure 9A:
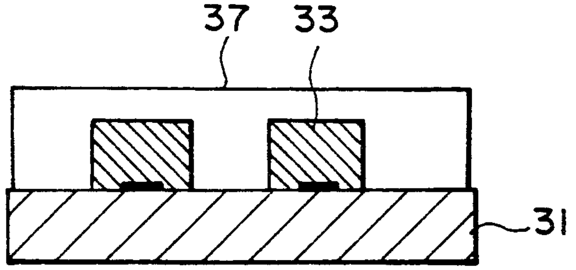
FIG. 9A and FIG. 9B: schematic cut sectional view of the first substrate after formation of the uneven member and the filling member.
Figure 9B:
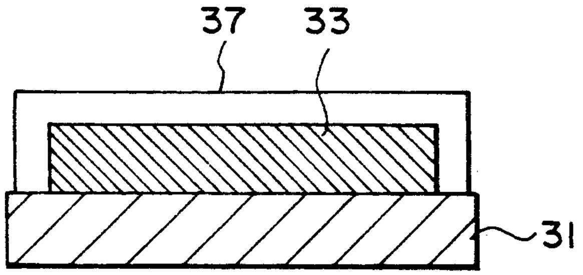

On the first substrate 31 having the above uneven member 33 formed thereon is laminated a filling member 37 so as to cover over said uneven member as shown in FIG. 9A and FIG. 9B, whereby the filling member 37 is filled at least within the concavity of the uneven member 33. The filling member 37 may be laminated directly on the uneven member, or alternatively the concavity may be filled by lamination on the uneven member under the state coated on the second substrate side as described below.

As the filling member 37, any material which can be provided to cover the above uneven member can be suitably used. However, since said material becomes the structural member of the liquid recording head by formation of the walls of the liquid channel and the common liquid chamber, it is preferable to choose and use one which is excellent in aspects of adhesion to the substrate, mechanical strength, dimensional stability, corrosion resistance. Specific examples of such material may be suitably active energy ray curable materials which are liquid and curable with UV-ray, visible light, X-ray, IR-ray, and electron beam, above all epoxy resins, acrylic resins, diglycol dialkylcarbonate resins, unsaturated polyester resins, polyurethane resins, polyimide resins, melamine resins, phenol resins, urea resins, etc. Particularly, epoxy resins which can initiate cation polymerization with light, acrylic oligomers having acrylic ester groups capable of radical polymerization with light, photo-addition polymerization type resins by use of polythiol and polyene, unsaturated acetal resins, etc. are great in polymerization rate, also excellent in the physical properties of polymer, and therefore suitable as the structural material.

As the lamination method of the filling member 37, for example, there may be specifically included the methods of lamination by means of discharging instruments by use of nozzles suitable for the substrate, applicator, curtain coater, roll coater, spray coater, spin coater, etc. In the case of laminating a liquid curable material, it is preferable to perform lamination while avoiding mixing of air bubbles after degassing said material.

Figure 10A:
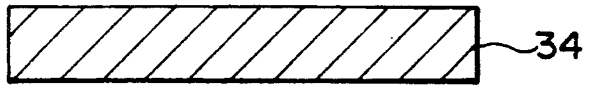
FIG. 10A and FIG. 10B: schematic sectional views of the second substrate after provision of the shielding layer of active energy ray on the second substrate.
Figure 10B:
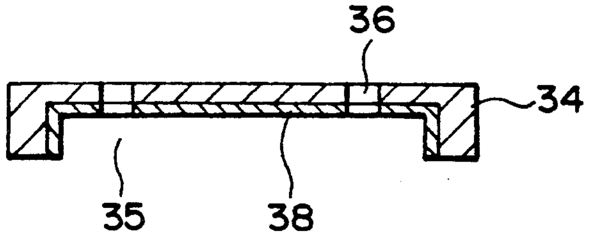

Next, as shown in FIG. 10A and FIG. 10B, a shielding layer 38 comprising shieldability against the active energy ray which can cure said filling material 37 is provided partially on at least a part of the surface of the second substrate 34 as described below opposed to said first substrate.

In this example, the shielding layer 38 is laminated only on the concavity which becomes the upper part of the ink liquid chamber previously provided on the second substrate, but said shielding layer is not limited on the concavity, but in designing of the liquid channel and the liquid chamber, can be also provided on the position corresponding the portion where the filling material 37 in the second substrate 34 is not required.

As the method for laminating the shielding layer 38 in a desired shape on the second substrate, various methods can be employed, such as screen printing, flexoprinting, the transfer method, or the method of laminating metal, etc. on the whole surface of said second substrate 34 by sputtering, plating, printing, etc. and then etching the unnecessary portion, or the lift-off method. Further, the method of dip coating said second substrate 34 in a solution of the shielding layer 38 and wiping off the portion other than the predetermined portions such as concavity, etc., or the method of plastering a masking tape at the portion where the shielding layer 38 is not required, and then dip coating it in the solution as mentioned above are also effective methods.

Figure 11A:
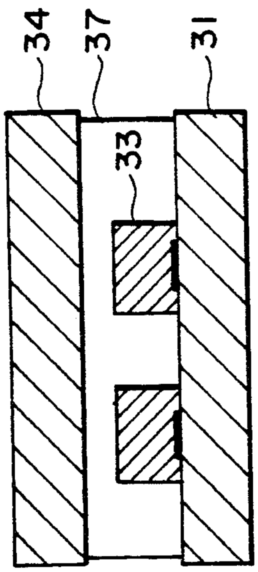
FIG. 11A and FIG. 11B: schematic sectional views of the laminate of the first substrate, the uneven member, the filling member, the shielding layer and the second substrate.
Figure 11B:
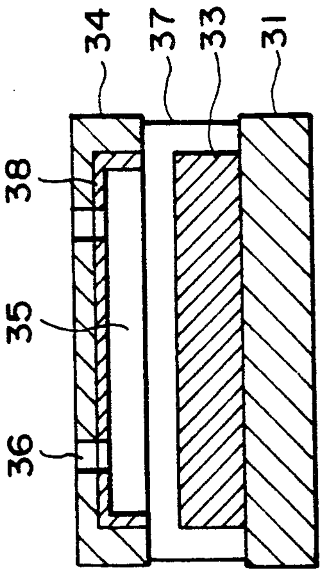

Next, after the shielding layer 38 is subjected, if necessary, with heat treatment, active energy ray irradiation, etc. to be fixed on said second substrate 34, said second substrate 34 is laminated on the filling material 37 of said first substrate as shown in FIG. 11A and FIG. 11B.

In this case, said second substrate 34 may also have concavities for obtaining desired liquid chamber volume at the liquid chamber forming site. Of course, the second substrate 34 can also use a desired material such as glass, plastic, photosensitive resin, metal, ceramics, etc., but when the step of the active energy ray irradiation is performed from said second substrate 34 side, it is required to be the active energy ray transmissive. Also, the second substrate 34 may be also provided previously with liquid feeding openings for feeding recording liquid. By irradiation of such energy ray, said irradiated portion of the filling material 37 (dashed portion shown by the symbol 40 in the Figure) is cured to form a cured resin layer, and also bonding between the first substrate 31 and the second substrate 34 is effected.

As the active energy ray, UV-ray, electron beam, visible light, IR-ray, X-ray, etc. can be utilized, but since exposure is effected by transmitting through the substrate UV-ray and visible light are preferable, and in aspect of the polymerization rate, UV-ray is the most suitable. As the ray source for UV-ray, light sources with high energy density such as high pressure mercury lamp, ultra-high pressure mercury lamp, halogen lamp, xenon lamp, metal halide lamp, carbon arc, etc. may be preferably employed. Although working with better precision can be done, as the light from these light sources is higher in parallelness and less in heat generation, UV-ray sources which are generally used for working of printing plate or print wiring plate or curing of photocurable type paint are generally available.

Subsequently, for example, when the orifice end surface is not exposed, if necessary, the laminate completed of the curing with the above-mentioned active energy ray irradiation is cut by means of a dicing saw by use of a diamond blade, etc. to have the orifice end surface exposed. However, such operation of cutting is not necessarily required, but, for example, when a liquid curable material is employed, a mold is used during lamination of said material so that the orifice tip end may not be covered, and also the orifice tip end may be molded smoothly, such cutting step is not necessary.

Figure 12A:
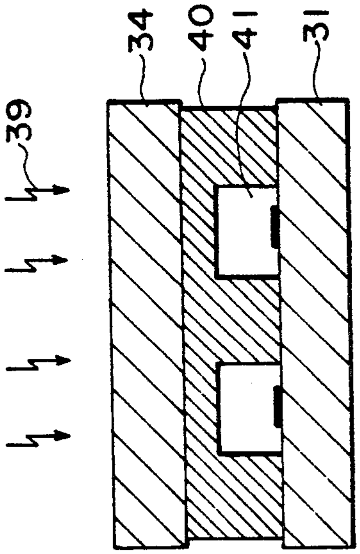
FIG. 12A and FIG. 12B; schematic cut sectional views of the laminate after removal of the uneven member and a part of the filling member.
Figure 12B:
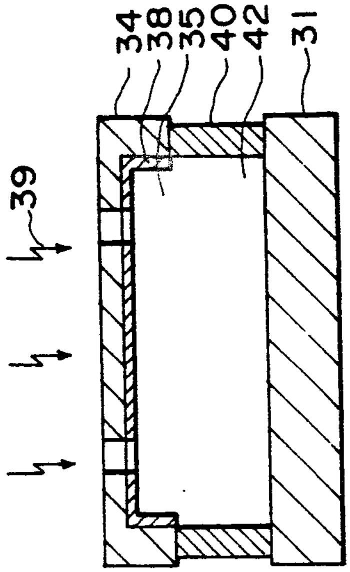

Subsequently, from the laminate completed of active energy ray irradiation are removed the uneven member 33 and the uncured portion of the filling material 37 as shown in FIG. 12A and FIG. 12B to form the liquid channel 41 and the liquid chamber 42.

In the present invention, since no active energy ray irradiation is effected on the filling member at the liquid chamber forming site, and it is removed under uncured state, the liquid chamber can be formed freely regardless of the liquid channel by controlling the layer thickness of the filling member laminated on the uneven member.

The method for removing the uneven member 33 and the uncured portion of the filling material 37 is not particularly limited, but specifically, for example, the method of removing by dipping in a liquid for removal which dissolves or swells or peel off the uneven member 33 and the uncured portion of the filling material 37 may be mentioned as a preferable one. In this case, if necessary, removal acceleration means such as sonication treatment, spraying, heating, stirring, vibration, pressurized circulation and others can be also used.

As the above-mentioned liquid for removal, for example, it can be used by choice from halo-containing hydrocarbons, ketones, esters, aromatic hydrocarbons, ethers, alcohols, N-methylpyrrolidone, dimethylformamide, phenol, water, water containing acid or alkali, etc. In said liquid for removal, a surfactant may be also added, if necessary. When a positive type dry film is used for the uneven member, it is preferable to apply UV-ray irradiation again on the uneven member for making removal easier, and in the case of using other materials, it is preferable to heat the liquid to 40° to 60° C.

FIG. 12A and FIG. 12B show the state after the uneven member 33 and the uncured portion of the filling material are removed as described above, and in the case of this example, the uneven member 33 and the uncured portion of the filling material are dissolved away by the dipping treatment in a liquid which dissolves them through the orifice of the head and the liquid feeding opening 36.

In this example, the shielding layer 38 also remains after completion of the head.

However, said shielding layer is not necessarily required to remain after completion of the head, but, for example, when the layer is desired to be removed for the case when observation of the inner portions of the liquid channel and the liquid chamber is required, etc., said shielding layer can be removed simultaneously when removing the uneven member and the uncured portion of the filling member by use of a material soluble in the solution for removing the uneven member and the uncured portion of the filling material as described above for formation of said layer. Also, the step of dissolving the shielding may be provided separately.

Figure 13:
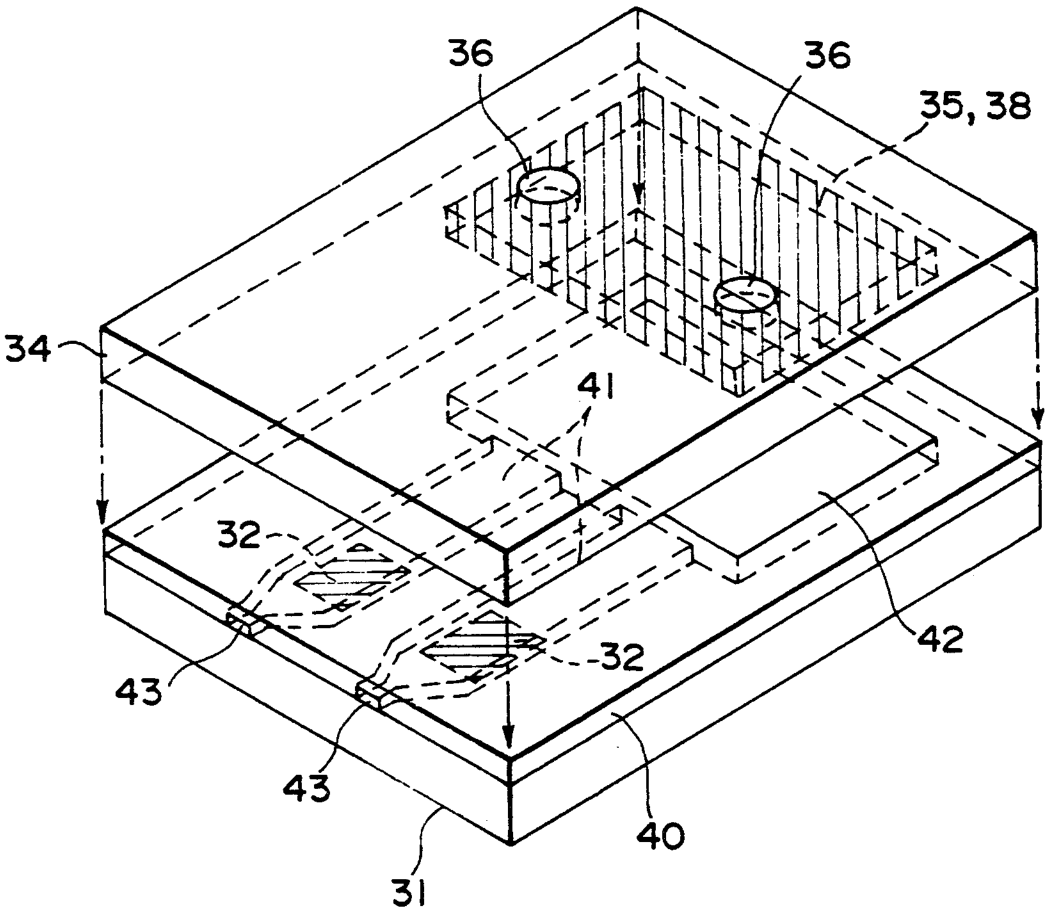

FIG. 13 shows a schematic perspective view of the liquid jet recording head obtained after the respective steps as described above. At the stage on completion of the respective steps as described above, for optimization of the distance between the energy generating element 32 and the orifice 43, the orifice tip end may be cut, polished, and smoothened, if necessary.

As industrial values of the process for producing the liquid jet recording head of the present invention, there are the advantages mentioned in the following respective items.

(1) Precise working is possible.

(2) There is little limitation in working for liquid channel shape and liquid chamber shape.

(3) In working, no particular skill is required, and bulk productivity is excellent.

(4) The scope of choice of active energy ray curable, materials is wide, and one excellent in functioning as the structural material can be used.

(5) The cost is low.

(6) A large liquid chamber demanded for a high density multi-array type recording head can be easily formed, and in addition the working step is simple to be suitable for bulk production.

(7) Since the shielding layer of active energy ray has the function as a mask, no mask when irradiating active energy ray during pattern exposure is required.

(8) Since the shielding layer of active energy ray as the mask exsists adjacent to the filling material, influence of diffraction of the active energy ray irradiated and the oblique light component on pattern exposure is very small, whereby pattern exposure with good precision can be effected without use of an expensive active energy ray irradiation device with high parallelness.

(9) Pattern edge of the pattern of the filling material subjected to patterning becomes sharp, whereby a head with high precision of the ink channel is formed.

In the examples as described above, the active energy ray 39 was irradiated from above the second substrate 34, but it is not necessarily required to be irradiated from said second substrate side, but may be irradiated also from said first substrate 31 side. In this case, the shielding layer 38 is laminated on the surface of said first substrate 31 opposed to the filling material 37 as a matter of course.

Also, in this case, when said discharge energy generating elements 32 or the electrodes for supplying energy to these, etc. intercept the active energy ray 39, said discharge energy generating elements 32 or electrodes, etc. are required to be arranged at suitable positions. Also, the provision of the discharge energy generating elements 32 or electrodes, etc. on said second substrate side is also an extremely effective method.

The active energy ray may be also irradiated from the respective side of both the first and the second substrates, and in that case, the shielding layer 38 is provided at the corresponding positions of both substrates, respectively. Anyway, the shielding layer is provided at the innerside of the first and the second substrates.

Figure 14:
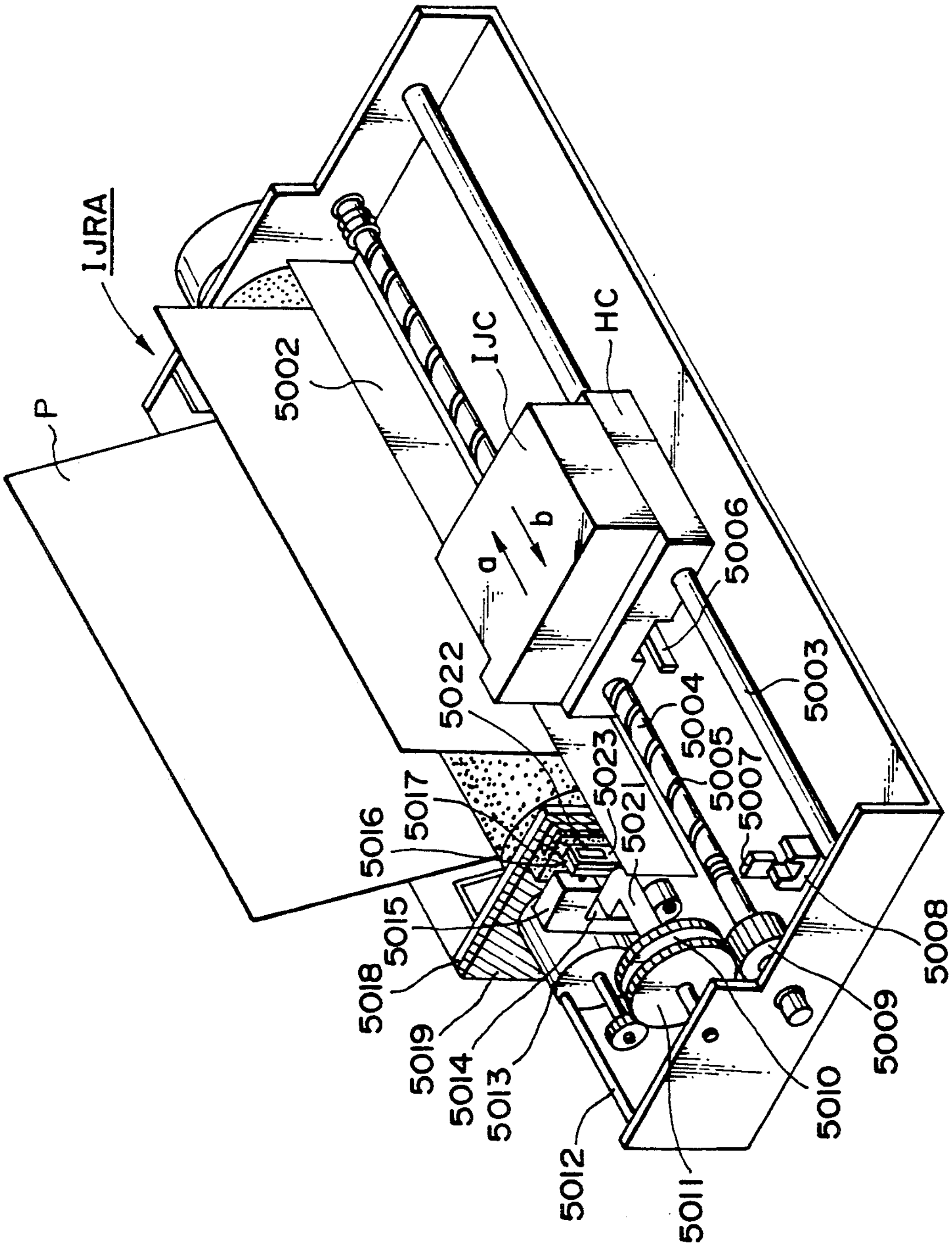
FIG. 14 is a perspective view showing the principal part of an example of the ink jet device having the line jet head produced by the production process of the present invention mounted thereon.

FIG. 14 is a schematic perspective view showing an example of an ink jet recording device IJRA on which the ink jet head prepared according to the production process of the present invention is mounted, wherein the carriage HC engaged with the spiral groove 5004 of the lead screw 5005 rotating through the driving force transmission gears 5011, 5009 associated with normal and reverse rotation of the driving motor 5013 has a pin (not shown), and is reciprocally moved in the directions of the arrowheads a, b. Numeral 5002 is a paper pressing plate, which presses a paper over the carriage movement direction against the platen 5000. Numerals 5007 and 5008 are home position detection means for performing rotational direction change-over, etc. of the motor 5013 by confirming the existence of the lever 5006 of the carriage with a photocoupler. Numeral 5016 is a member for supporting the cap member 5022 which caps the front surface of the recording head IJC of the cartridge type provided integrally with an ink tank, 5015 is an aspiration means for aspirating internally of the cap and performs aspiration restoration of the recording head through the opening 5023 within the cap. Numeral 5017 is a cleaning blade, 5019 a member for making the blade movable back and forth, and these are supported on the main body supporting plate 5018. The blade is not limited to this form, but a cleaning blade well known in the art can be of course applied to this example. Numeral 5012 is a lever for initiating aspiration for aspiration restoration, and moves with movement of a cam (not shown) associated with the carriage, and the driving force from the driving motor can be controlled by known transmission means such as clutch change-over, etc.

The present invention brings about excellent effects particularly in a recording head, a recording device of the bubble jet system.

As to its representative constitution and principle, for example, one practiced by use of the basic principle disclosed in, for example, U.S. Pat. Nos. 4,723,129 and 4,740,796 is preferred. This system is applicable to either of the so called on-demand type and the continuous type. Particularly, the case of the on-demand type is effective, because, by applying at least one driving signal which gives rapid temperature elevation exceeding nucleus boiling corresponding to the recording information on electricity-heat converters arranged corresponding to the sheets or liquid channels holding liquid (ink), heat energy is generated at the electricity-heat convertors to effect film boiling at the heat acting surface of the recording head, and consequently the bubbles within the liquid (ink) can be formed corresponding one by one to the driving signals. By discharging the liquid (ink) through an opening for discharging by growth and shrinkage of the bubble, at least one droplet is formed. By making the driving signals into pulse shapes, growth and shrinkage of the bubble can be effected instantly and adequately to accomplish more preferably discharging of the liquid (ink) particularly excellent in response characteristic. As the driving signals of such pulse shape, those as disclosed in U.S Pat. Nos. 4,463,359 and 4,345,262 are suitable. Further excellent recording can be performed by employment of the conditions described in U.S. Pat. No. 4,313,124 of the invention concerning the temperature elevation rate of the above-mentioned heat acting surface.

As the constitution of the recording head, in addition to the combination constitutions of discharging orifice, liquid channel, electricity-heat converter (linear liquid channel or right angle liquid channel) as disclosed in the above-mentioned respective specifications, the constitution by use of U.S. Pat. Nos. 4,558,333, 4,459,600 disclosing the constitution having the heat acting portion arranged in the flexed region is also included in the present invention. In addition, the present invention can be also effectively made the constitution as disclosed in Japanese Patent Laid-open Application No. 59-123670 which discloses the constitution using a slit common to a plurality of electricity-heat convertors as the discharging portion of the electricity-heat convertors or Japanese Patent Laid-open Patent Application No. 59-138461 which discloses the constitution having the opening for absorbing pressure wave of heat energy correspondent to the dicharging portion.

Further, as the recording head of the full line type having a length corresponding to the maximum width of recording medium which can be recorded by the recording device, either the constitution which satisfies its length by combination of a plurality of recording heads as disclosed in the above-mentioned specifications or the constitution as one recording head integrally formed may be used, and the present invention can exhibit the effects as described above, further effectively.

In addition, the present invention is effective for a recording head of the freely exchangeable chip type which enables electrical connection to the main device or supply of ink from the main device by being mounted on the main device, or for the case by use of a recording head of the cartridge type provided integrally on the recording head itself.

Also, addition of a restoration means for the recording head, a preliminary auxiliary means, etc. provided as the constitution of the recording device of the present invention is preferable, because the effect of the present invention can be further stabilized. Specific examples of these may include, for the recording head, capping means, cleaning means, pressurization or aspiration means, electricity-heat convertors or another heating element or preliminary heating means or a combination of these, and it is also effective for performing stable recording to include a preliminary mode which performs discharging separate from recording.

Further, as the recording mode of the recording device, the present invention is extremely effective for not only the recording made only of a primary stream color such as black, etc., but also a device equipped with at least one of plural different colors or full color by color mixing, whether the recording head may be either integrally constituted or combined in plural number.

In the examples of the present invention as described above, description has been made by use of liquid ink, but in the present invention both an ink which is solid at room temperature and an ink which is softened at room temperature can be used. In the ink jet device as described above, temperature control is generally practiced so that the viscosity of the ink may be within stable discharge region by performing temperature control of the ink itself within the range from 30° C. to 70° C., and therefore the ink may be liquid when recording signals to be used are imparted. In addition, by preventing positive temperature elevation by heat energy by using it as the energy for phase change from the solid state to the liquid state, or by using an ink which is solidified when left to stand for the purpose of prevention of evaporation of the ink, any use of an ink which is liquefied for the first time by heat energy, such as one which is discharged as ink liquid by liquefaction of the ink by imparting heat energy corresponding to signals or an ink which already begins to be solidified at the point reaching a recording meduim, etc. is also applicable in the present invention. In such case, the ink may be made in the form opposed to electricity-heat convertors under the state held as liquid or solid matter in the concavity or the thru-hole of a porous sheet as described in Japanese Patent Laid-open Application No. 54-56847 and No. 60-71260. In the present invention, the most effective for the respective inks as described above is one which implements the film boiling systems as described above.

We claim:

1. A process for producing a liquid jet recording head, said process comprising the steps of:

filling a filling material having photosensitivity to active energy, in concave portions of a convex-concave member, the convex-concave member having convex and concave protions on a same surface of the member and the filling material being provided for forming a liquid channel on the member communicating with a discharge opening for discharging liquid;

providing a substrate having a sheilding layer for shielding against the active energy, over the filling material, the shielding layer being provided on the side of the substrate opposing the convex-concave member and a part of the filling material corresponding to the pattern to form the liquid channel.

irradiating the active energy in a pattern on the filling material by use of the shielding layer; and removing the convex portions of the convex-concave member and a 2. A process according to claim 1, wherein during said filling step the filling material is filled until the convex portion of the convex-concave member is covered.

3. A process according to claim 1, wherein the substrate is formed of a material through which the active energy is capable of penetrating.

4. A process according to claim 1, wherein the substrate is provided with the discharge opening and the shielding layer is provided corresponding to the discharge opening.

5. A process according to claim 1, wherein the shielding layer is formed integrally with the substrate, the substrate is provided with the discharge opening, and the discharge opening is provided with the shielding material for shielding the active energy.

6. A process according to claim 1, wherein the substrate is provided with the discharge opening and the discharge opening is provided with the shielding material for shielding the active energy.

7. A process according to claim 1, wherein the convex-concave member is provided with an energy generating member for generating energy for discharging liquid from the discharge opening.

8. A process according to claim 7, wherein the energy generating member is an electrothermal transducer for generating heat energy.

9. A process according to claim 7, wherein the energy generating member is a piezoelectric element.

10. A liquid jet recording head produced by a process comprising the steps of:

filling a filling material having photosensitivy to active energy, in concave portions of a convex-concave member, the convex-concave member having convex and concave portions on a same surface of the member and the filling material being provided for forming a liquid channel communicating with a discharge opening for discharging liquid;

providing a substrate having a shielding layer for shielding against the active energy, over the filling material, the shielding layer being provided on the side of the substrate opposing the convex-concave member;

irradiating the active energy in a pattern on the filling material by use of the shielding layer; and removing the convex portions of the convex-concave member and a part of the filling material corresponding to the pattern to form said liquid channel.

11. A head according to claim 10, wherein a direction that the liquid is supplied to the liquid channel, provided with an energy generating member for generating energy for discharging the liquid, is the same as a direction that the liquid is discharged.

12. A head according to claim 10, wherein a direction that the liquid is supplied to the liquid channel, provided with an energy generating member for generating energy for discharging the liquid, is substantially perpendicular to a direction that the liquid is discharged.

13. a liquid jet recording apparatus comprising a liquid jet recording head according to claim 12 and transporting means for transporting a recording medium on which recording is effected by the liquid jet recording head.

* * * * *

UNITED STATES PATENT AND TRADEMARK OFFICE
CERTIFICATE OF CORRECTION

PATENT NO. : 5,126,768

DATED : June 30, 1992

INVENTOR(S) : MINORU NOZAWA, ET AL.

It is certified that error appears in the above-identified patent and that said Letters Patent is hereby corrected as shown below:

COLUMN 1

Line 13, "type," should read --type--.
Line 44, "wear" should read --were--.
Line 66, "liquid," should read --liquid-- and "strength" should read --strength,--.

COLUMN 4

Line 33, "The" should read --the-- and "iradiating" should read --irradiating--.
Line 58, "diffractions," should read --diffraction,--.

COLUMN 5

Line 6, "discharged" should read --discharge--.
Line 28, "extend," should read --extent,--.
Line 54, "view" should read --views--.

COLUMN 6

Line 8, "line" should read --ink--.

COLUMN 7

Line 8, "negative" should read --a negative--.
Line 43, "here" should read --there--.
Line 44, "screen" should read --screen ink--.

UNITED STATES PATENT AND TRADEMARK OFFICE
CERTIFICATE OF CORRECTION

PATENT NO. : 5,126,768
DATED : June 30, 1992
INVENTOR(S) : MINORU NOZAWA, ET AL.

It is certified that error appears in the above-identified patent and that said Letters Patent is hereby corrected as shown below:

COLUMN 8

Line 2, "shape" should read --shaped--.
Line 48, "provision" should read --or provision--.
Line 52, "rat" should read --ray--.

COLUMN 10

Line 9, "peel" should read --peels--.
Line 46, "dispensing" should read --dispersing--.

COLUMN 11

Line 18, "HFB2" should read --$HFB_2$--.
Line 35, "are formed" should be deleted.

COLUMN 13

Line 34, "remained" should read --remaining--.

COLUMN 14

Line 34, "here" should read --there--.

COLUMN 15

Line 50, "corresponding" should read --corresponding to--.

COLUMN 16

Line 63, "peel" should read --peels--.

--

UNITED STATES PATENT AND TRADEMARK OFFICE
CERTIFICATE OF CORRECTION

PATENT NO. : 5,126,768

DATED : June 30, 1992

INVENTOR(S) : MINORU NOZAWA, ET AL.

It is certified that error appears in the above-identified patent and that said Letters Patent is hereby corrected as shown below:

COLUMN 17

Line 2, "used by choice" should read --chosen--.
Line 34, "shielding" should read --shielding layer--.
Line 51, "curable," should read --curable--.
Line 63, "exsists" should read --exists--.

COLUMN 18

Line 25, "innerside" should read --inner side--.
Line 44, "tank," should read --tank.--.

COLUMN 19

Line 38, "Patent" (second occurrence) should be deleted.

COLUMN 20

Line 38, "systems" should read --system--.
Line 51, "sheilding" should read --shielding--.
Line 55, "member and a part of the filling material corre-" should read ----member;--.
Line 56 should be deleted.
Line 60, "a" should read --a part of the filling material corresponding to the pattern to form the liquid channel.--.

--

UNITED STATES PATENT AND TRADEMARK OFFICE

CERTIFICATE OF CORRECTION

PATENT NO. : 5,126,768

DATED : June 30, 1992

INVENTOR(S) : MINORU NOZAWA, ET AL.

It is certified that error appears in the above-identified patent and that said Letters Patent is hereby corrected as shown below:

<u>COLUMN 22</u>

Line 23, "a liquid" should read --A liquid--.

Signed and Sealed this

Fifth Day of July, 1994

Attest:

Bruce Lehman

BRUCE LEHMAN

Attesting Officer

*Commissioner of Patents and Trademarks*